(12) United States Patent
Ancona et al.

(10) Patent No.: US 12,004,518 B2
(45) Date of Patent: Jun. 11, 2024

(54) ELECTRIC DOUGH SHEETER MACHINE

(71) Applicant: IMPERIA & MONFERRINA S.P.A., Rome (IT)

(72) Inventors: Enrico Ancona, Rome (IT); Alessandro Zenato, Rome (IT)

(73) Assignee: IMPERIA & MONFERRINA S.P.A., Rome (IT)

( * ) Notice: Subject to any disclaimer, the term of this patent is extended or adjusted under 35 U.S.C. 154(b) by 274 days.

(21) Appl. No.: 17/413,066

(22) PCT Filed: Dec. 19, 2018

(86) PCT No.: PCT/IT2018/000167
§ 371 (c)(1),
(2) Date: Jun. 11, 2021

(87) PCT Pub. No.: WO2020/129094
PCT Pub. Date: Jun. 25, 2020

(65) Prior Publication Data
US 2022/0039398 A1 Feb. 10, 2022

(51) Int. Cl.
*A21C 3/02* (2006.01)
(52) U.S. Cl.
CPC ................ *A21C 3/024* (2013.01); *A21C 3/02* (2013.01)
(58) Field of Classification Search
CPC .................................. A21C 3/02; A21C 3/024
See application file for complete search history.

(56) References Cited

U.S. PATENT DOCUMENTS

| 1,319,080 | A |   | 10/1919 | Hottmann |            |
|-----------|---|---|---------|----------|------------|
| 2,323,907 | A | * | 7/1943  | Harriss  | A21C 3/02  |
|           |   |   |         |          | 425/335    |
| 2,596,215 | A |   | 5/1952  | Crosland |            |
| 3,014,438 | A | * | 12/1961 | Seewer   | A21C 3/02  |
|           |   |   |         |          | 425/340    |

(Continued)

FOREIGN PATENT DOCUMENTS

EP 0270488 A2 6/1988
EP 0450309 A1 10/1991

*Primary Examiner* — S. Behrooz Ghorishi
*Assistant Examiner* — Alexander A Wang
(74) *Attorney, Agent, or Firm* — LUCAS & MERCANTI, LLP; Klaus P. Stoffel (57) ABSTRACT

An electric sheeting machine for forming a sheet from a food dough, including: a supporting frame; two sheet forming rollers supported in the frame; a first scraper blade and a second scraper blade supported in the frame, staggered from each other in height and having a respective beveled edge. The machine further has: first and second articulated connection elements which connect the scraper blades with respect to the frame, in an oscillating manner; first and second elastic members which each stress a respective scraper blade to maintain an oscillated position, in which the respective beveled edge is arranged in sliding contact against the cylindrical lateral surface of the corresponding forming roller. The first and second connection elements are configured to allow the scraper blades to oscillate in opposition to the elastic force of the respective elastic member, in a second oscillated position, in which the beveled edge is spaced with respect to the cylindrical lateral surface of the corresponding forming roller and each scraper blade can be removed from the frame.

6 Claims, 7 Drawing Sheets

(56) References Cited

U.S. PATENT DOCUMENTS

| | | | | |
|---|---|---|---|---|
| 4,398,877 A | * | 8/1983 | Taylor | A23G 3/0247 |
| | | | | 425/363 |
| 5,783,222 A | * | 7/1998 | Voyatzakis | A21C 3/06 |
| | | | | 425/320 |
| 8,512,026 B1 | | 8/2013 | Voyatzakis | |
| 2016/0120190 A1 | | 5/2016 | Haas | |
| 2020/0045984 A1 | * | 2/2020 | Stelzer | A21C 3/02 |

\* cited by examiner

ELECTRIC DOUGH SHEETER MACHINE

CROSS-REFERENCE TO RELATED APPLICATIONS

The present application is a 371 of International application PCT/IT2018/000167, filed Dec. 19, 2018, the priority of this application is hereby claimed and this application is incorporated herein by reference.

BACKGROUND OF THE INVENTION

The present invention concerns an electric dough sheeter machine for forming a sheet from a food dough.

More in particular, the present invention relates to a benchtop electric dough sheeter machine.

A known electric dough sheeter machine of the type specified comprises:

a supporting frame;

two sheet forming rollers supported in said frame, having respective horizontal axes and respective cylindrical peripheral surfaces opposite and staggered from each other in height, which delimit between them a free interspace for the passage of a food dough and the forming of a corresponding sheet between said two forming rollers. One of said two forming rollers, hereinafter lower roller, is supported in a stationary position, while the other of said two forming rollers, hereinafter upper roller, is supported to be able to move parallel with respect to said lower roller. Said free interspace provides upstream, in the direction of feed of the dough through said two forming rollers, an inlet for insertion of the dough between said two rollers and downstream an outlet for removal of the sheet from said two rollers. Said two forming rollers are kinematically connected to each other so as to rotate simultaneously in opposite directions and feed the food dough from said inlet toward and beyond said outlet;

electric gear motor means supported in said frame, kinematically connected with respect to one of said two forming rollers and selectively electrically connected, by means of electric feed and control circuit means (per se known and not illustrated), with respect to a power supply network;

feed hopper means supported in said frame, configured as dough feed chute, having an upper feeding surface parallel to the axes of said two forming rollers and extending, with downward inclination, from a distal and upstream position with respect to said inlet until it is in proximity to said lower roller;

a first scraper blade and a second scraper blade, supported in said frame, staggered from each other in height, arranged on opposite sides with respect to said free interspace, downstream of said outlet of the sheet, and each comprising a respective plate, having a beveled edge arranged in sliding contact with respect to the cylindrical lateral surface of a corresponding of said two forming rollers.

As is evident from the foregoing, the known electric dough sheeter machine of the type indicated above comprises two sheet forming rollers that are operatively driven to rotate in mutual proximity by means of the electric gear motor means. An operator in charge of preparing the sheet uses his/her hands to insert and remove the food dough with respect to said forming rollers. In particular, it is relatively easy for the operator to place his/her hands at the dough inlet and/or at the sheet outlet, and between one of said forming rollers and the upper part or lower part of the frame. This fact represents a serious risk for the operator's safety.

Moreover, the known electric dough sheeter machine of the type indicated above allows the operator to insert his/her hands from above inside the frame, after having removed a corresponding upper part of the protective casing, even during operation of the machine. This fact also represents a serious risk for the operator's safety.

Moreover, the known electric dough sheeter machine of the type indicated above does not allow operations to clean the internal parts of the machine to be carried out in an easy, rapid and safe manner, when the machine is not operating. In particular, the known machine does not allow the scraper blades to be easily removed to clean them and enable easy access with respect to the other internal parts of the machine, in particular with respect to the two forming rollers, in order to carry out cleaning and maintenance thereon.

SUMMARY OF THE INVENTION

The present invention intends to provide an electric dough sheeter machine for forming a sheet from a food dough, which enables the aforesaid problems to be overcome.

In particular, an object of the present invention is to provide an electric dough sheeter machine for forming a sheet from a food dough, that allows—when the machine is not operating—cleaning of the internal parts and maintenance operations to be carried out in an easy, rapid and safe manner.

Another object of the present invention is to provide an electric dough sheeter machine as indicated, which allows—when the machine is operating—a high level of safety for the operator in charge of processing the dough and preparing the related sheet.

A further object of the present invention is to provide an electric dough sheeter machine as indicated, which has a simple structure, reliable and safe operation and is easy to carry out maintenance on.

The essential features of the electric dough sheeter machine for forming a sheet from a food dough, according to the present invention, are described in claim 1.

Further advantageous features of the invention are described in the dependent claims.

Other features and advantages of the invention will be apparent from the following detailed description of an example of embodiment of the electric dough sheeter machine for forming a sheet from a food dough according to the present invention with reference to the drawing, which shows important details for the invention, and from the claims.

The features illustrated are not necessarily to scale and are represented so that the specific features according to the invention are clearly highlighted.

The different features can be carried out individually or in any combination with one another, as variants of the invention.

DETAILED DESCRIPTION OF THE INVENTION

Figure 4:
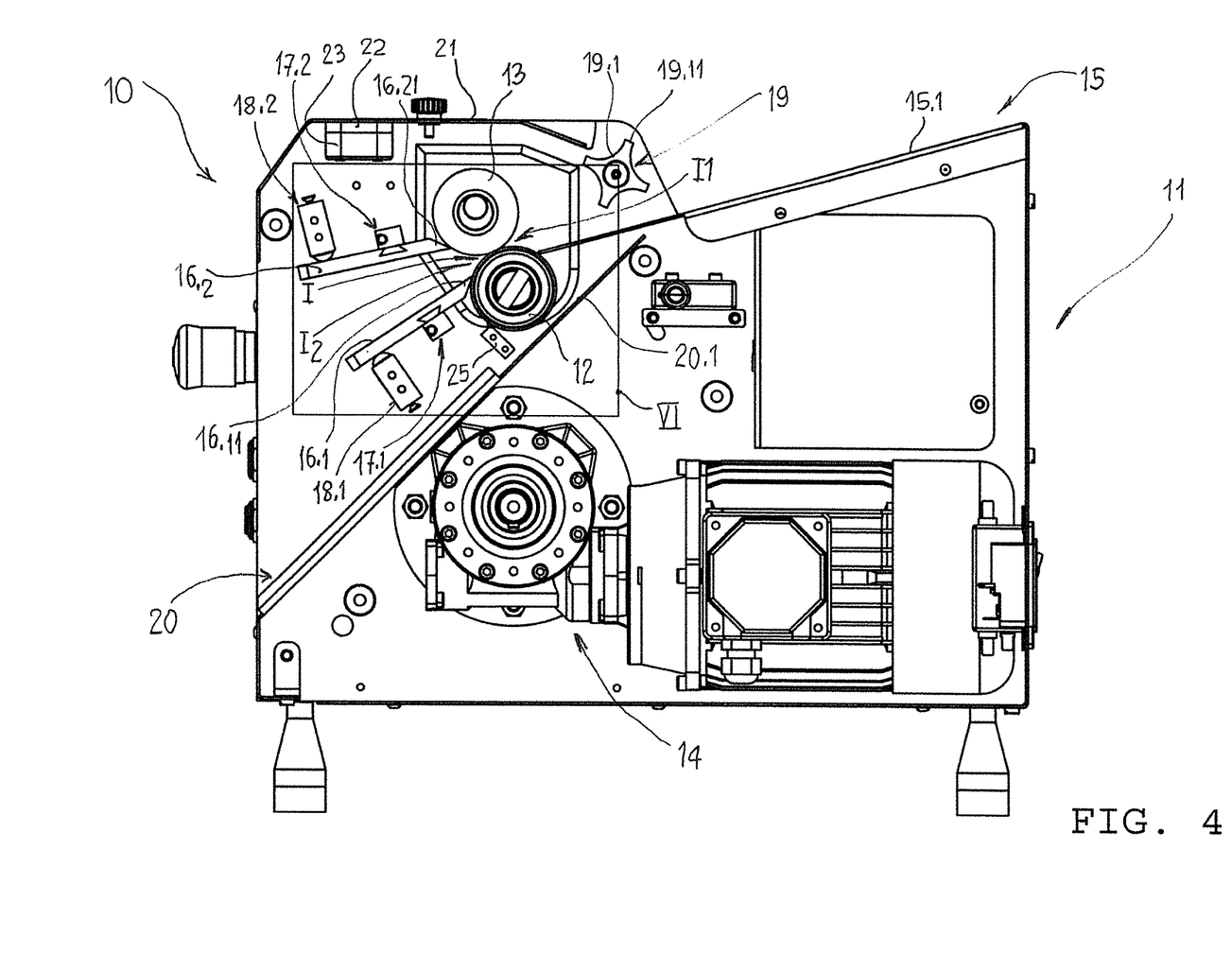
FIG. 4 is a side elevation view, in a different scale, of the machine of FIG. 1, in which a lateral wall of said frame is omitted for clarity of illustration.
Figure 9:
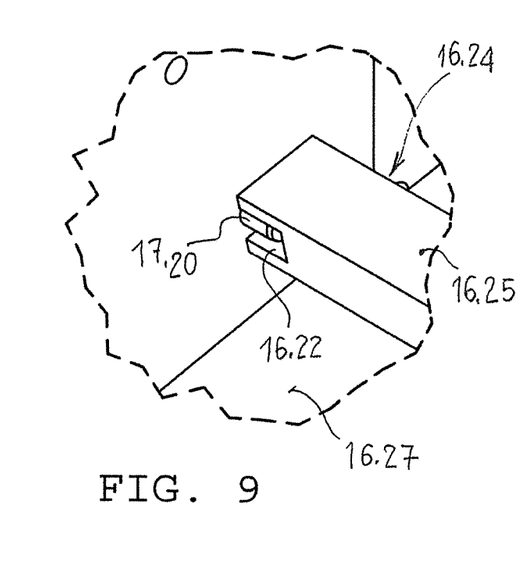
FIG. 9 is a detailed view, in a larger scale, of the detail IX of FIG. 8.

With reference to the accompanying drawing, the numeral 10 indicates as a whole the electric dough sheeter machine for forming a sheet from a food dough, according to an embodiment of the present invention. Said machine 10 comprises:

a supporting frame 11;

two sheet forming rollers 12, 13 supported in said frame 11, having respective horizontal axes and respective cylindrical peripheral surfaces opposite and staggered from each other in height, which delimit between them a free interspace I (FIG. 4) for the passage of a food dough and the forming of a corresponding sheet between said two forming rollers, wherein the roller 12 of said two forming rollers 12, 13, hereinafter lower roller 12, is supported in a stationary position, while the other roller 13 of said two forming rollers 12, 13, hereinafter upper roller 13, is supported to be able to move parallel with respect to said lower roller 12, and wherein said free interspace I provides upstream, in the direction of feed of the dough through said two forming rollers, a dough inlet I1 and downstream a sheet outlet I2, said two forming rollers 12, 13 being kinematically connected to each other so as to rotate simultaneously in opposite directions and feed the food dough from said inlet I1 toward and beyond said outlet I2;

electric gear motor means 14 supported in said frame 11, kinematically connected (in a manner known per se and not illustrated) with respect to one of said two forming rollers 12, 13 and selectively electrically connected, by means of electric supply and control circuit means (known per se and not illustrated), with respect to a power supply network;

feed hopper means 15 supported in said frame 11, configured as a feed chute 15.1 of the dough, having an upper feed surface parallel to the axes of said two forming rollers 12, 13 and extending, with downward inclination, from a distal and upstream position with respect to the inlet I1 until it is in proximity to said lower roller 12;

a first scraper blade 16.1 and a second scraper blade 16.2, supported in said frame 11, staggered from each other in height and arranged on opposite sides with respect to said free interspace I, downstream of said outlet I2 of the sheet and each comprising a respective plate 16.10, 16.20 (FIGS. 6 and 9), having a respective beveled edge 16.11, 16.21 arranged in sliding contact with respect to the cylindrical lateral surface of a corresponding of said two forming rollers 12, 13.

It can be noted, in particular, that said upper roller 13 is supported to be able to move in said frame 11, in an oscillating manner by means of eccentric means controlled manually in oscillation by means of control lever means L supported externally to said frame 11.

Figure 8:
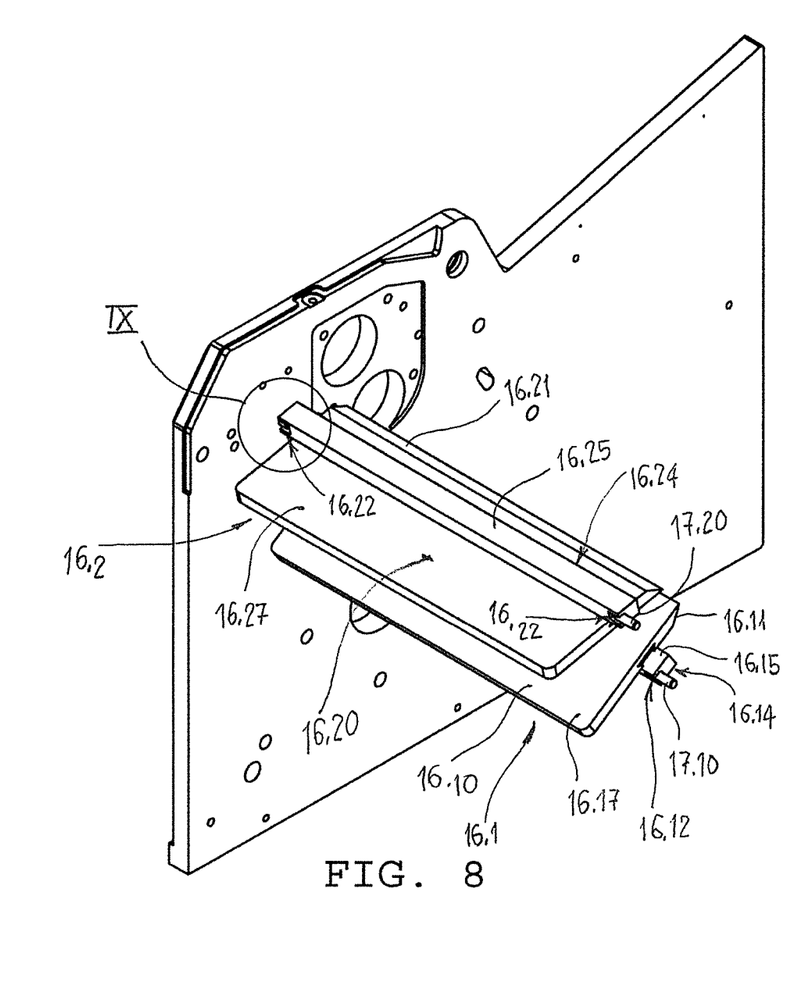
FIG. 8 is a perspective top inner view of a lateral wall of said frame of the machine and of said two scraper blades, which illustrates how said blades are connected in an oscillating manner with respect to said lateral wall.

According to the present invention and as illustrated in the present embodiment, said machine 10 further comprises:

first articulated connection means 17.1 and second articulated connection means 17.2 (in particular see FIGS. 4, 6 and 8) provided for the connection of a respective of said first scraper blade 16.1 and second scraper blade 16.2 with respect to said frame 11, in a manner oscillating about a respective axis parallel to the axes of said two forming rollers 12, 13 and located at an intermediate portion of said plate 16.10, 16.20 of the corresponding scraper blade 16.1, 16.2;

first elastic means 18.1 and second elastic means 18.2 (in particular see FIGS. 4, 6 and 7) supported with respect to said frame 11 and configured to stress a respective of said first scraper blade 16.1 and second scraper blade 16.2 to maintain a respective first oscillated position about a related axis, wherein the respective beveled edge 16.11, 16.21 is arranged in sliding contact against the 20 cylindrical lateral surface of the corresponding forming roller 12, 13 (as illustrated in the aforesaid figures).

Moreover, said first connection means 17.1 and said second connection means 17.2 are configured to allow, respectively, said first scraper blade 16.1 and said second scraper blade 16.2 to oscillate about the respective axis and in opposition to the elastic force of the said respective first elastic means 18.1 and second elastic means 18.2, in a respective second oscillated position, wherein the respective beveled edge 16.11, 16.21 is spaced with respect to the cylindrical lateral surface of the corresponding forming roller 12, 13 and said first scraper blade 16.1, respectively second scraper blade 16.2, can be removed from said frame 11.

In particular, said first articulated connection means 17.1 and said second articulated connection means 17.2 comprise, respectively, two connection pins 17.10, 17.20, opposite each other, fixed on opposite parts of said frame 11 and aligned with each other according to an axis parallel to the axes of said two forming rollers 12, 13, and two recesses 16.12, 16.22 provided in two opposite lateral walls of said first scraper blade 16.1, respectively of said second scraper blade 16.2, and aligned with each other according to an axis parallel to the axes of said two forming rollers 12, 13, wherein said two recesses 16.12, 16.22 provide in the first scraper blade 16.1, respectively in the second scraper blade 16.2, corresponding housing seats of said two respective fixed and opposite pins 17.10, 17.20. Moreover, each of said recesses 16.12, 16.22 is also open on a lateral wall contiguous to said opposite lateral walls of each of said first and second scraper blades 16.1, 16.2 and distal with respect to the corresponding forming roller 12, 13, so as to allow the removal of each of said first and second scraper blades 16.1, 16.2 from said frame 11 by means of a relative movement of each scraper blade 16.1, 16.2 with respect to the corresponding pair of fixed and opposite pins 17.10, 17.20, so as to arrange each scraper blade 16.1, 16.2 in said respective second oscillated position.

Preferably, to obtain removal of said first scraper blade 16.1 with respect to the frame 11, said first scraper blade 16.1 is thrust manually downward, in opposition to the elastic force of said first elastic means 18.1, causing its beveled edge 16.11 to oscillate upward, and is then moved toward the corresponding forming roller 12, which causes the respective connection pins 17.10 to exit from the corresponding seats 16.12 provided in said first scraper blade 16.1.

Inversely, to obtain the removal of said second scraper blade 16.2 with respect to the frame 11, said second scraper blade 16.2 is thrust manually upward, in opposition to the elastic force of said second elastic means 18.2, causing its beveled edge 16.21 to oscillate downward, and is then moved forward toward the corresponding forming roller 13, which causes the corresponding connection pins 17.20 to exit from the corresponding seats 16.22 provided in said second scraper blade 16.2.

Figures 6, 7:
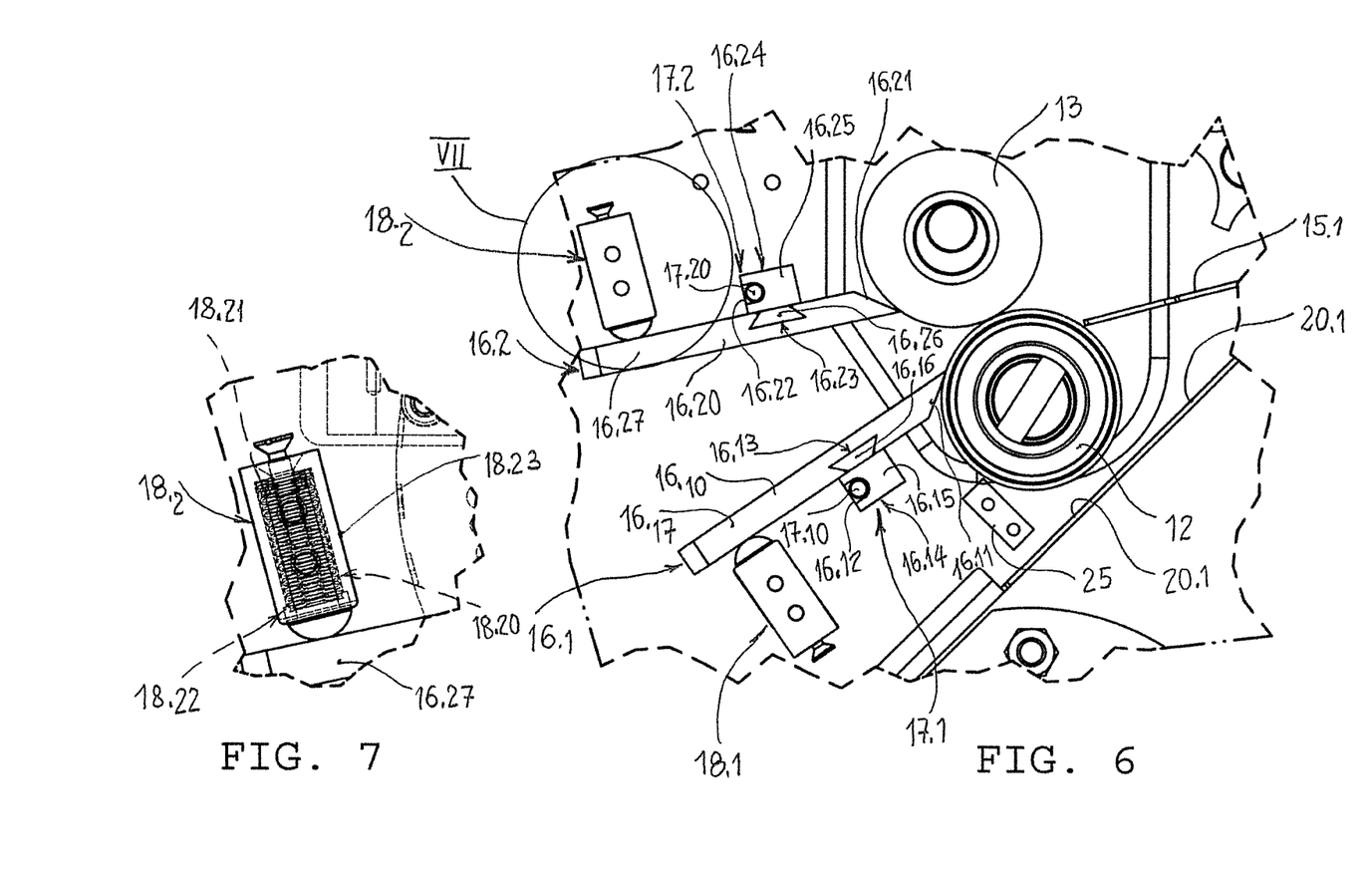
FIG. 6 is a detailed view, in a larger scale, of the detail VI of FIG. 4.
FIG. 7 is a detailed view, in a larger scale, of the detail VII of FIG. 6.

With particular reference to FIG. 6, it can be noted that the plate 16.10, 16.20 of said first scraper blade 16.1 and of said second scraper blade 16.2 comprises a dovetail groove 16.13, 16.23 parallel to the corresponding beveled edge 16.11, 16.21, provided in an intermediate portion of said plate 16.10, 16.20 and open at said two opposite lateral walls of said scraper blades, and respective supporting means 16.14, 16.24, comprising a rigid body 16.15, 16.25 and at least one dovetail protrusion 16.16, 16.26 projecting from said rigid body and removably coupled with respect to said groove 16.13, 16.23 of said plate 16.10, 16.20. Moreover, said rigid body 16.15, 16.25 has said two recesses 16.12, 16.22 which provide said housing seats of said two respective fixed and opposite connection pins 17.10, 17.20.

In particular, said rigid body 16.15, 16.25 comprises a rigid bar provided with said dovetail protrusion 16.16, 16.26, which is connected sliding with respect to said dovetail groove 16.13, 16.23 of said plate 16.10, 16.20, with which it produces a geometric coupling.

Moreover, said first elastic means 18.1 and said second elastic means 18.2 comprise, respectively, at least one elastic member (only the elastic member 18.20 of the second elastic means 18.2 is illustrated in FIG. 7) supported, with a first end (18.21), with respect to a part of said frame 11 in a stationary and resting arrangement, with a second end (18.22), against an end area 16.17, 16.27 of the respective scraper blade 16.1, 16.2 opposite and distal with respect to the corresponding beveled edge 16.11, 16.21. Moreover, said first elastic means 18.1 and said second elastic means 18.2 are configured to exert against the respective scraper blade 16.1, 16.2 an elastic force that automatically maintains the same blade in said first respective oscillated position.

In particular, said first elastic means 18.1 and said second elastic means 18.2 comprise a respective coil spring housed in a corresponding case (18.23), connected with respect to said frame 11.

It can be noted that, in the example illustrated, said first elastic means 18.1 and said second elastic means 18.2 comprise a respective pair of elastic members, for example 18.20, co-acting with the corresponding first scraper blade 16.1 and second scraper blade 16.2.

Figure 5:
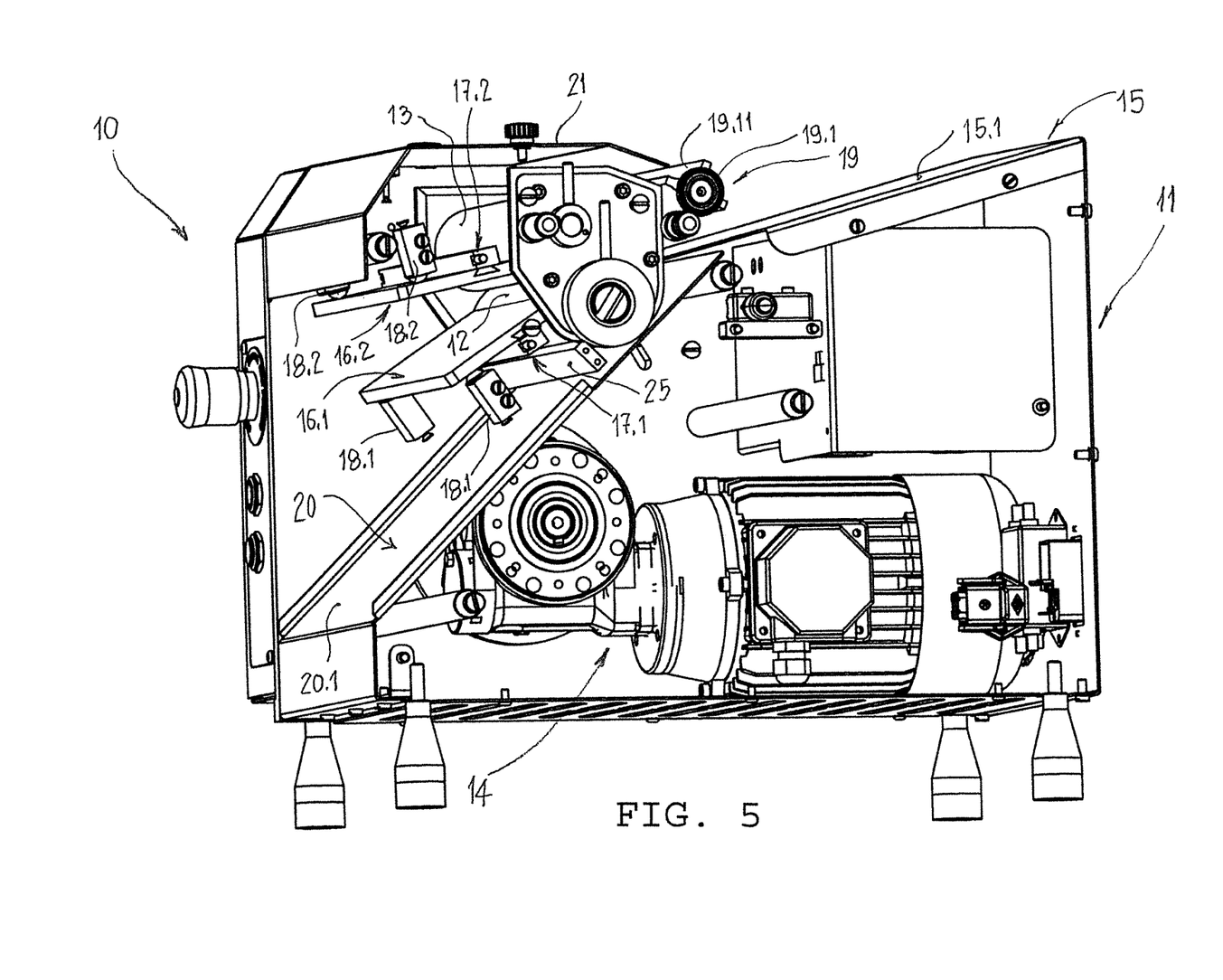
FIG. 5 is a perspective bottom view of the machine according to FIG. 4.

Said machine 10 further comprises manual feed means 19 of the food dough (FIGS. 4, 5), comprising a feed roller 19.1 supported rotating freely with respect to said frame 11 about an axis parallel to the axes of said two forming rollers 12, 13, arranged over said feed hopper means 15, upstream and in proximity to said dough inlet I1. Said feed means 19 are arranged so as to provide a physical barrier in front of said free interspace I between said two forming rollers 12, 13 to protect the fingers of the hand of an operator who feeds the dough along said feed hopper means 15. Moreover, said feed roller 19.1 has a plurality of radial fins 19.11 configured to provide, on one side, gripping surfaces to manually rotate said feed roller 19.1 in the direction of feed of the food dough toward said two forming rollers 12, 13 and, on the other side, protrusions that engage and draw at least a portion of food dough along said feed hopper means 15 toward said two forming rollers 12, 13.

It can be noted that said machine 10 further comprises protective guard means 20 (FIGS. 4, 5), arranged at least partially downstream of said outlet I2 of the sheet and comprising a plate 20.1 fixed in said frame 11, arranged according to a plane parallel to the axes of said two forming rollers 12, 13, extending at least until it is in proximity to the cylindrical lateral surface of said lower forming roller 12 and stretched in front of said same lower forming roller 12 until it is in proximity to a base part of said frame 11. Said protective guard means 20 are configured to close the space inside said frame 11, in the part of said frame 11 in front of said outlet I2 of the sheet and under said lower forming roller 12, so as to provide a physical barrier preventing the insertion of the fingers of a hand of an operator below said forming rollers 12, 13, in the base part of the frame 11, in which said electric gear motor means 14 are housed.

Figure 3:
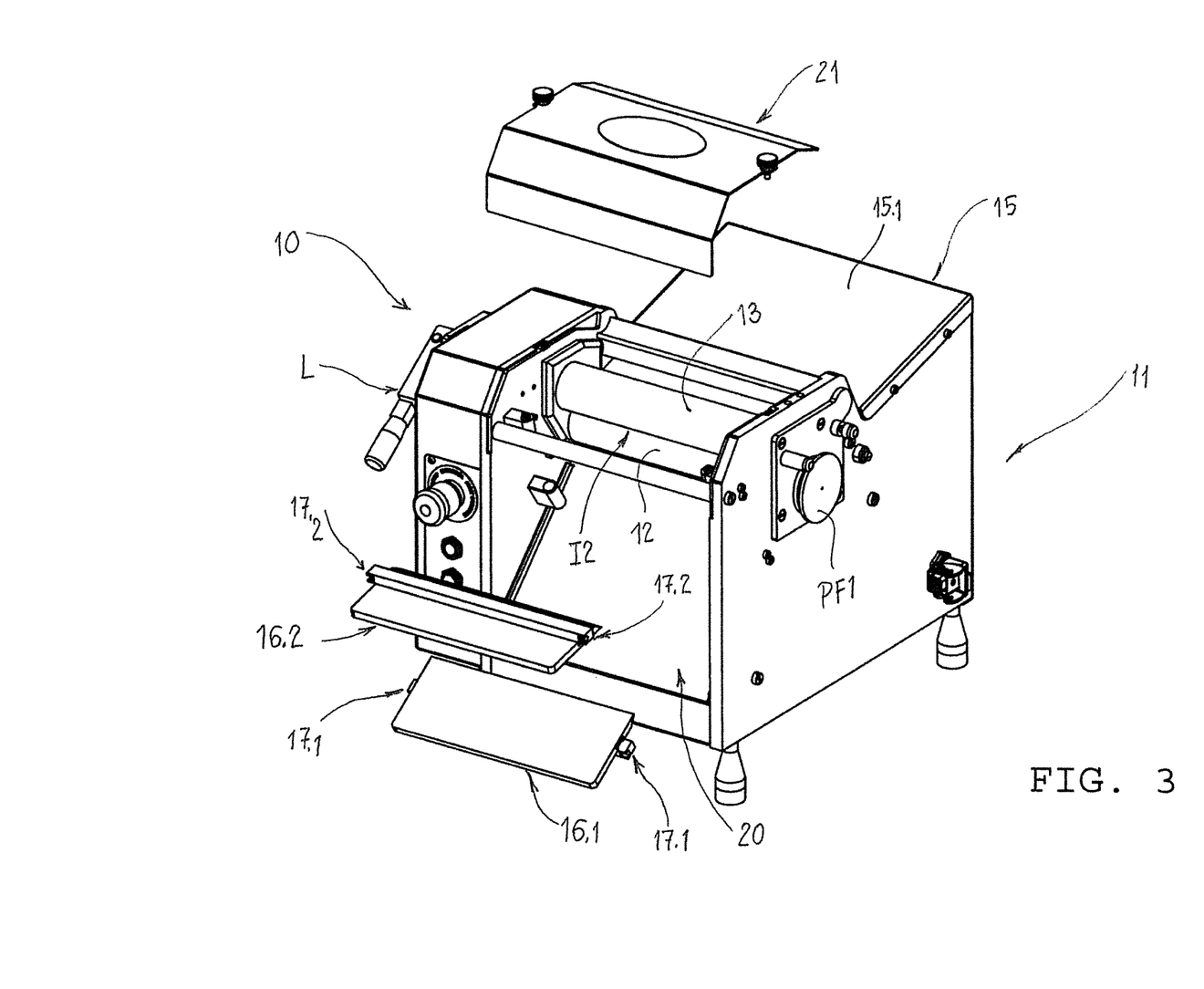
FIG. 3 shows a similar view to that of FIG. 1, but in which a top covering part of said frame and two scraper blades of the machine are illustrated in an exploded view.

It can also be noted that said machine 10 comprises top safety cover means 21 (FIGS. 3, 4, 5), removably fixed with respect to said frame 11 and arranged over said two forming rollers 12, 13, and of the electric safety circuit means, including magnetic sensor means 22 fixed with respect to said cover 21 and corresponding magnetic microswitch means 23 fixed with respect to said frame 11, which are configured to produce the electric closing of said electric safety circuit when said cover means 21 are correctly fixed with respect to said frame 11 and to produce electric opening of said electric safety circuit when said cover means 21 are not correctly fixed with respect to said frame 11.

By means of this arrangement, said electric safety circuit means, when said cover means 21 are removed or are not correctly fixed with respect to the frame 11, electrically and automatically open said electric supply and control circuit means of said electric gear motor means 14.

It can be noted that said magnetic sensor means 22 and said magnetic microswitch means 23 are uniquely functionally associated with each other.

Moreover, further protective barrier means 25 (FIGS. 4, 5) are provided fixed in said frame 11, at and below said lower forming roller 12 and above said protective guard 20, which are configured as rigid crosspiece 25.1, fixed between the lateral walls of the frame 11 and which frontally closes, below said outlet I2, the free space between said lower forming roller 12 and said protective guard 20. This arrangement prevents an operator from inserting, from the front part of the machine 10, the fingers of a hand between said lower forming roller 12 and said protective guard 20.

Figure 1:
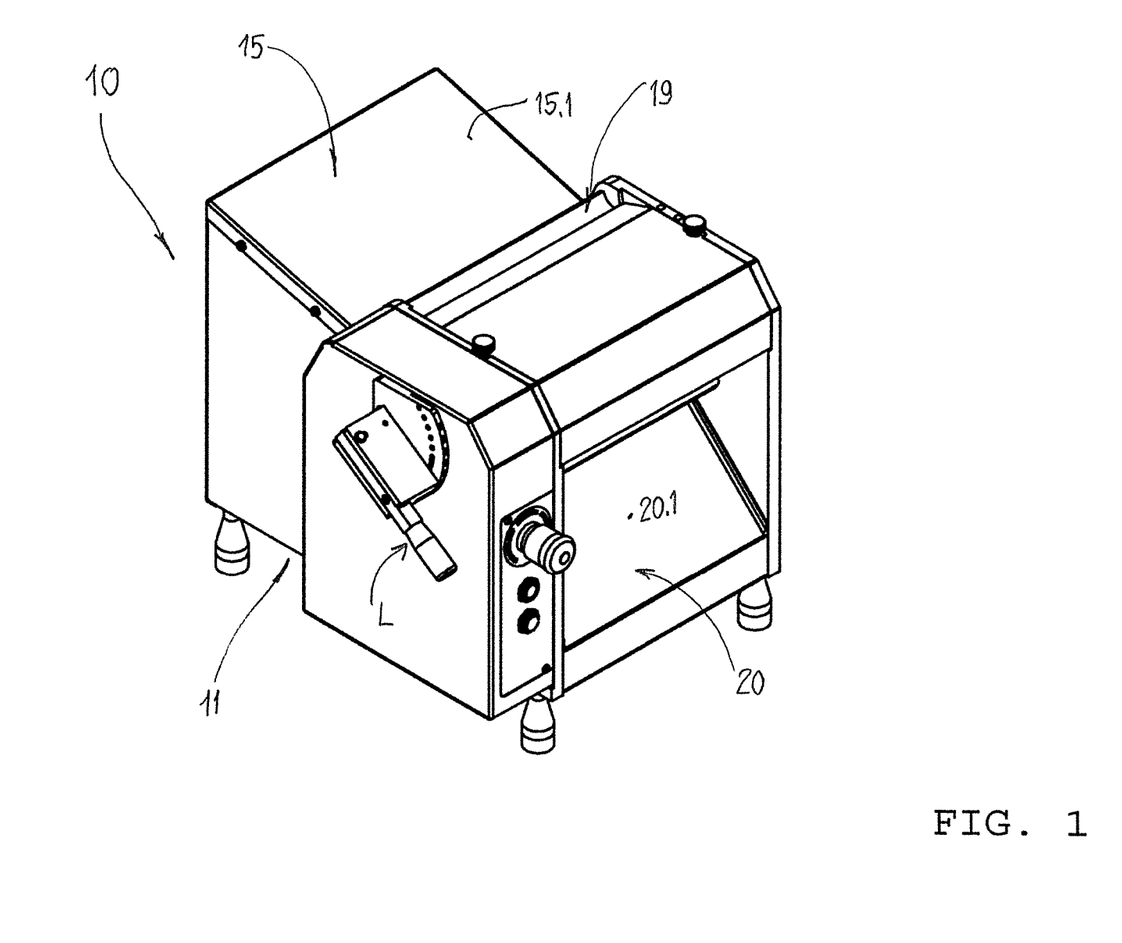
FIG. 1 is a perspective front top view of the electric dough sheeter machine according to an embodiment of the present invention, mainly showing the supporting frame of the machine.
Figure 2:
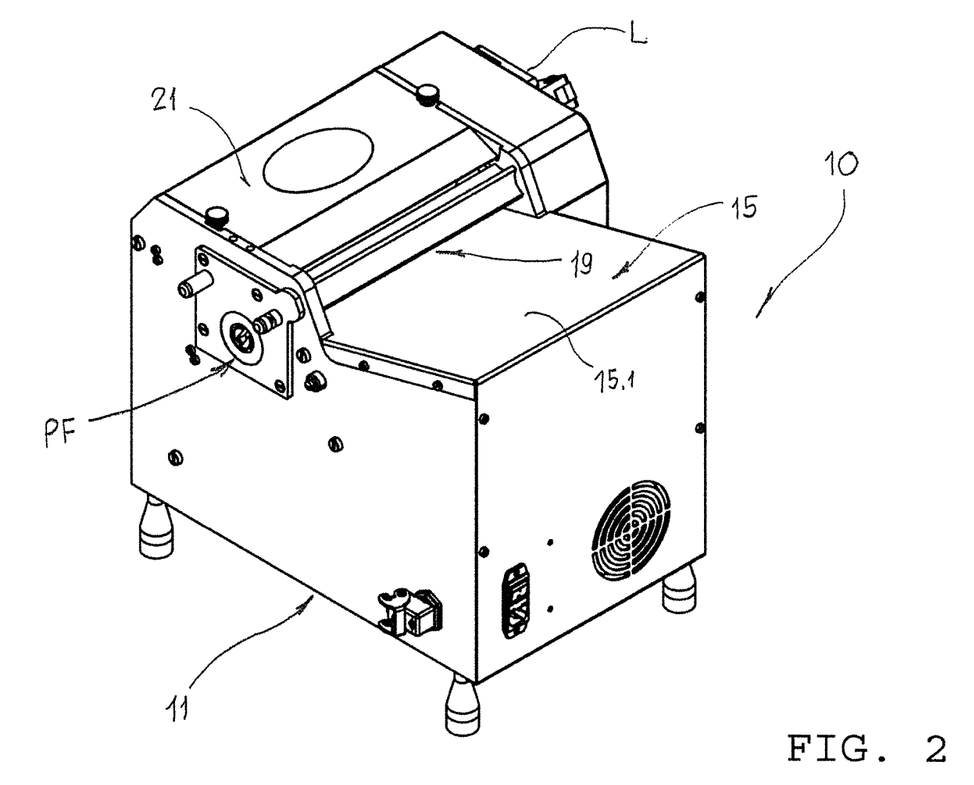
FIG. 2 is a perspective rear top view of the electric dough sheeter machine according to FIG. 1.

Moreover, it can be noted that on one side of the frame 11 there is provided a power take off PF (FIGS. 2, 3), kinematically branched from said electric gear motor means 14 and configured to produce the kinematic connection of external accessory devices (not illustrated), in which the sheet produced by the machine 10 can be further processed. For example, a device for preparing ravioli or the like (not illustrated) can be kinematically connected with respect to said power take off of the machine 10. For the safety of the machine, said power take off is covered by means of a cap PF1 made of plastic material, so as to protect the power take off when the machine 10 is operating without any accessory device connected.

As can be seen from the above, the present invention makes it possible to achieve the objects indicated in the introductory part of this description in a simple and effective manner.

In particular, the present invention provides an electric dough sheeter machine for forming a sheet from a food dough, which:

when the machine is not operating, enables cleaning of the inner members and maintenance operations to be carried out easily, rapidly and safely;

when the machine is operating, provides a high level of safety for the operator in charge of processing the dough and of preparing the related sheet.

Moreover, the electric dough sheeter machine according to the present invention has a simple structure, is reliable and safe to operate and easy to carry out maintenance on.

The invention claimed is:

1. An electric dough sheeter machine for forming a sheet from a food dough, comprising;

a supporting frame;

two sheet forming rollers supported in said frame, having respective horizontal axes and respective cylindrical peripheral surfaces opposite and staggered from each other in height, which delimit between them a free interspace for the passage of a food dough and the forming of a corresponding sheet between said two forming rollers, wherein one of said two forming rollers, hereinafter lower roller, is supported in a stationary position, while the other of said two forming rollers, hereinafter upper roller, is supported to be able to move parallel with respect to said lower roller and wherein said free interspace provides upstream, in the direction of feed of the dough through said two forming rollers, an inlet for insertion of the dough between said two rollers and downstream an outlet for removal of the sheet from said two rollers, said two forming rollers being kinematically connected to each other so as to rotate simultaneously in opposite directions and feed the food dough from said inlet toward and beyond said outlet;

electric gear motor means supported in said frame, kinematically connected with respect to one of said two forming rollers and selectively electrically connected, by means of electric supply and control circuit means, with respect to a power supply network;

feed hopper means supported in said frame, configured as a feed chute of the dough, having an upper feed surface parallel to the axes of said two forming rollers and extending, with downward inclination, from a distal and upstream position with respect to the inlet until it is in proximity to said lower roller;

a first scraper blade and a second scraper blade, supported in said frame, staggered from each other in height and arranged on opposite sides with respect to said free interspace, downstream of said outlet of the sheet and each comprising a respective plate, having a beveled edge arranged in sliding contact with respect to the cylindrical lateral surface of a corresponding of said two forming rollers;

first articulated connection means and second articulated connection means provided for the connection of a respective of said first scraper blade and second scraper blade with respect to said frame, in a manner oscillating about a respective axis parallel to the axes of said two forming rollers and located at an intermediate portion of said plate of the corresponding scraper blade;

first elastic means and second elastic means supported with respect to said frame and configured to stress a respective of said first scraper blade and second scraper blade to maintain a respective first position oscillated about the related axis, wherein the respective beveled edge is arranged in sliding contact against the cylindrical lateral surface of the corresponding forming roller;

and wherein said first connection means and said second connection means are configured to allow, respectively, said first scraper blade and said second scraper blade to oscillate, about the respective axis and in opposition to an elastic force of the said respective first elastic means and second elastic means, in a second respective oscillated position, in which the respective beveled edge is spaced with respect to the cylindrical lateral surface of the corresponding forming roller and said first scraper blade and second scraper blade can be removed from said frame, wherein said first articulated connection means and said second articulated connection means comprise, respectively, two connection pins, opposite each other, fixed on opposite sides of said frame and aligned with each other according to an axis parallel to the axes of said two forming rollers, and two recesses provided in two opposite lateral walls of said first scraper blade, respectively of said second scraper blade, and aligned with each other according to an axis parallel to the axes of said two forming rollers, wherein said two recesses provide in the first scraper blade, respectively in the second scraper blade, corresponding housing seats of said two respective fixed and opposite pins, and in that each of said recesses is also open on a lateral wall contiguous to said opposite lateral walls of each of said first and second scraper blades and distal with respect to the corresponding forming roller, so as to allow the extraction of each of said first and second scraper blades from said frame by means of a relative movement of each scraper blade with respect to the corresponding pair of fixed and opposite pins, when each scraper blade is arranged in said second oscillated position, and wherein said respective plate of said first scraper blade and of said second scraper blade comprises a groove parallel to the corresponding beveled edge, provided in an intermediate portion of said respective plate and open at said two opposite lateral walls, and respective support means, comprising a rigid body and at least one protrusion projecting from said rigid body and removably coupled with respect to said groove of said plate, and in that said rigid body has said two recesses that provide said housing seats of said two respective fixed and opposite connection pins.

2. The electric dough sheeter machine according to claim 1, wherein said first elastic means and said second elastic means comprise, respectively, at least one elastic member supported, at a first end, with respect to a part of said frame in a stationary and resting arrangement, at a second end, against an end area of the respective scraper blade, opposite and distal with respect to the corresponding beveled edge, and in that said first elastic means and said second elastic means are configured to exert against the respective scraper blade an elastic force that automatically maintains the same blade in said respective first oscillated position.

3. The electric dough sheeter machine according to claim 1, wherein comprises manual feed means of the food dough, comprising a feed roller supported rotating freely with respect to said frame about an axis parallel to the axes of said two forming rollers, arranged over said feed hopper means, upstream and in proximity to said inlet of the dough, in that said feed means are arranged so as to provide a physical barrier in front of said inlet of said free interspace between said two forming rollers, to protect the fingers of the hand of an operator who feeds the dough along said feed hopper means, and in that said feed roller has a plurality of radial fins configured to provide gripping surfaces to manually rotate said feed roller in the direction of feed of the food dough toward said two forming rollers and protrusions that engage and draw at least a portion of food dough along said feed hopper means toward said two forming rollers.

4. The electric dough sheeter machine according to claim 1, further comprising protective guard means, arranged at least partly downstream of said outlet of the sheet and comprising a plate fixed in said frame, arranged according to a plane parallel to the axes of said two forming rollers, extending at least until it is in proximity to the cylindrical lateral surface of said lower forming roller and stretched in front of said same lower forming roller until it is in proximity to a base part of said frame, and in that said protective guard means are configured to close the space inside said frame, at least in the part of said frame in front of said outlet of the sheet and under said lower forming roller, so as to provide a physical barrier against the insertion of the fingers of a hand of an operator below said forming rollers, in the base part of the frame, in which said electric gear motor means are housed.

5. The electric dough sheeter machine according to claim 4, further comprising barrier protection means provided fixed in said frame, below said lower forming roller and above said protective guard, which are configured as a rigid crosspiece, fixed between the lateral walls of the frame and which frontally close, below said outlet, the free space between said lower forming roller and said protective guard.

6. The electric dough sheeter machine according to claim 1, further comprising top safety cover means, fixed removably with respect to said frame and arranged over said two forming rollers, and electric safety circuit means, including magnetic sensor means fixed with respect to said safety cover and corresponding magnetic microswitch means fixed with respect to said frame, which are configured to produce the electric closing of said electric safety circuit when said cover means are correctly fixed with respect to said frame and to produce the electric opening of said electric safety circuit when said cover means are not correctly fixed with respect to said frame, and in that said magnetic sensor means and said magnetic microswitch means are uniquely functionally associated with each other.

\* \* \* \* \*